A. D. PURTLE.
BRASS LINER STUFFING BOX HEAD.
APPLICATION FILED JAN. 22, 1920.
1,394,114.
Patented Oct. 18, 1921.
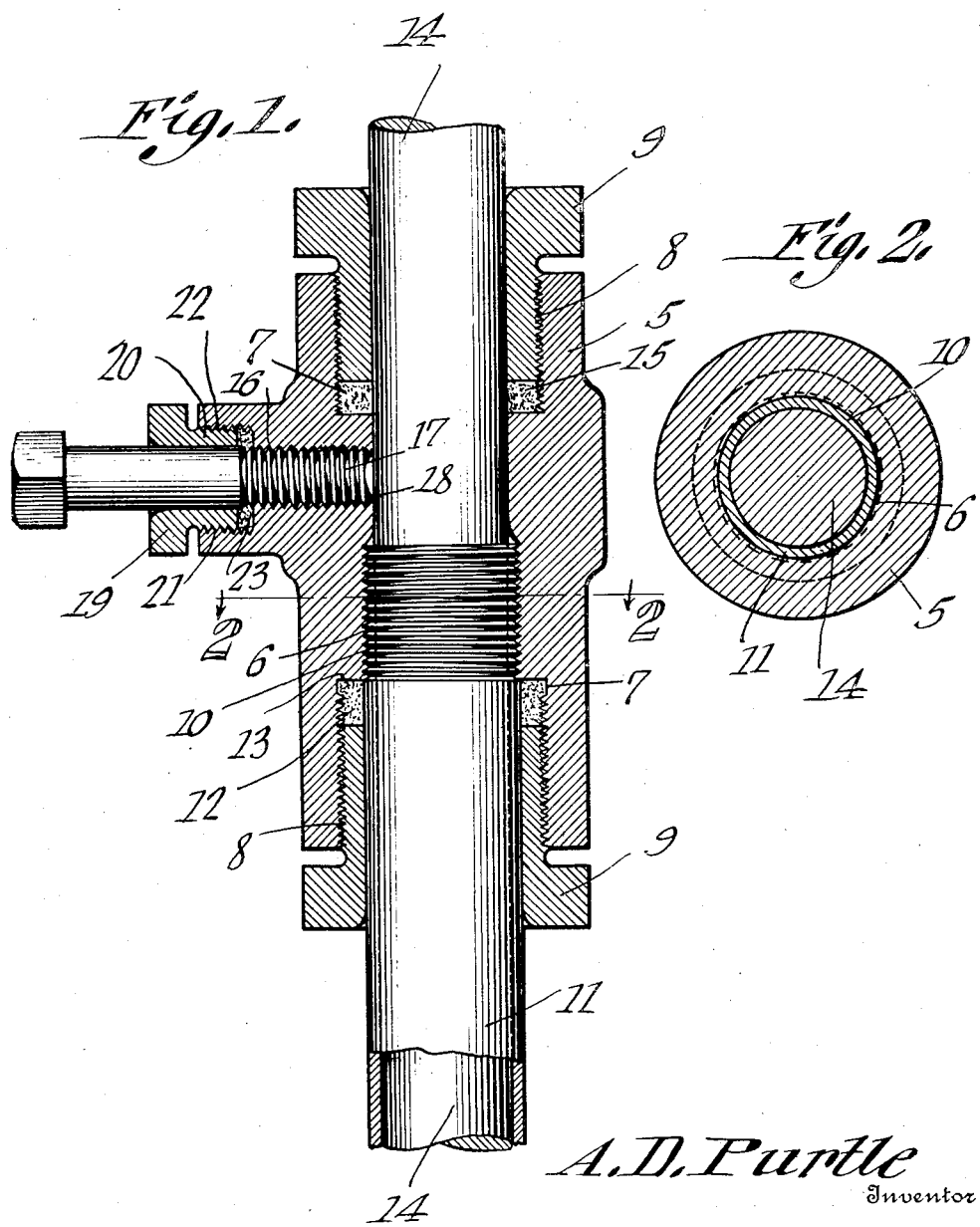
A. D. Purtle
Inventor

UNITED STATES PATENT OFFICE.

ALBERT D. PURTLE, OF MARIETTA, OHIO.

BRASS LINER STUFFING-BOX HEAD.

1,394,114.  Specification of Letters Patent.  Patented Oct. 18, 1921.

Application filed January 22, 1920. Serial No. 353,352.

*To all whom it may concern:*

Be it known that I, ALBERT D. PURTLE, a citizen of the United States, residing at Marietta, in the county of Washington and State of Ohio, have invented a new and useful Brass Liner Stuffing-Box Head, of which the following is a specification.

This invention relates to pumps, and more particularly to improved brass liner stuffing box heads thereof.

The primary object of the invention is to provide a brass liner stuffing box head having novel means for providing a water-tight connection between the liner and the head, thus insuring against leakage and consequently reducing the oil wasted, to a minimum.

A further object of the invention is to provide a device of this character wherein the brass liner may be readily and easily applied to the stuffing box head, in a manner to prevent displacement of the brass liner, when the pump is brought into operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a longitudinal sectional view through a stuffing box head constructed in accordance with the present invention; and Fig. 2 illustrates a sectional view taken on line 2—2 of Fig. 1.

Referring to the drawing in detail, the reference character 5 designates the stuffing box head which is formed of any suitable metal, the same being relatively long and having a central bore 6 for accommodating the polished rod and liner, forming elements of the pump.

As shown, this central bore 6 is enlarged adjacent its ends, as at 7, the walls of which are threaded as at 8 to receive the threaded followers 9, which followers are of sizes to closely fit over the pump element associated therewith.

A portion of the length of the central bore 6 has its walls threaded to receive the upper threaded portion 10 of the liner 11, so that the liner may be firmly united with the stuffing box head 5, the lower follower 9 being positioned over the liner 11 and having its inner end contacting with the packing material 12, which may be in the form of a circular fibrous material, so that by rotating the follower, the packing gland is firmly wedged against the shoulder 13, formed at the base of the enlargement 7.

The follower 9 at the upper end of the stuffing box head is positioned on the polished rod 14, and has its inner end contacting with a fibrous packing gland 15, positioned within the enlargement 7 at the upper end of the stuffing box head.

Formed within the stuffing box head 5, is a lateral opening 16, threaded to receive the set screw 17, the inner end of which is provided with a cutting edge 18 adapted to bite into the polished rod 14 for holding the same in predetermined positions of adjustment, in a manner to eliminate any possibility of the liner moving from its proper position on the polished rod.

Supported on the set screw 17, is a follower 19, which follower has a threaded extension 20 coöperating with the threads 21 provided on the inner wall of the opening 22, which is in communication with the opening 16.

Supported between the inner end of the follower 19, and the shoulders formed by the enlarged opening at one end of the opening 16, is a packing gland 23, which packing gland prevents fluid from passing laterally from the stuffing box head.

From the foregoing it is obvious that due to the packing glands 12 and 15, an absolutely water-tight connection is maintained between the stuffing box head, brass liner and polished rod, to the end that oil waste is reduced to a minimum.

Having thus described the invention, what is claimed is:

1. A stuffing box head having a central opening, the walls of said opening being threaded throughout a portion of their lengths, said central opening merging into enlarged openings at the ends thereof, a liner having a threaded extremity coöperating with the threads of the walls of the central opening for securing the liner to the stuffing box head, a polished rod operating through the stuffing box head and through the liner, means embracing a portion of the liner and polished rod for providing fluid tight connection therebetween, and means for securing the polished rod against movement within the stuffing box.

2. A stuffing box head having a central opening, a liner having one of its ends secured within the central opening, said central opening merging into enlarged openings, a polished rod operating through the stuffing box head and through the liner, means positioned within the enlarged openings for providing fluid tight connections between the liner and polished rod, and means for securing the polished rod to the stuffing box head.

3. A stuffing box head having a central opening, merging into enlarged openings adjacent the ends thereof, a liner positioned within the central opening, a polished rod operating through the stuffing box head and liner, followers operating in the enlarged openings, packing glands in the openings and adapted to be held therein by the followers, and means for securing the polished rod to the stuffing box head.

4. A stuffing box head having a central opening, a liner having one of its ends positioned in the opening, a polished rod operating through the opening, means embracing a portion of the polished rod for providing a fluid tight connection between the stuffing box head and polished rod, means for providing a fluid tight connection between the liner and stuffing box head, said stuffing box head having a lateral opening, a set screw extending through the lateral opening, and engaging the polished rod for securing the polished rod to the stuffing box head, and means for providing a fluid tight connection between the polished rod, stuffing box head and set screw.

In testimony that I claim the foregoing as my own, I have hereto affixed my signature in the presence of two witnesses.

ALBERT D. PURTLE.

Witnesses:
    WINFIELD S. HANCOCK,
    FRED C. MYERS.